Figures 1, 2, 3:
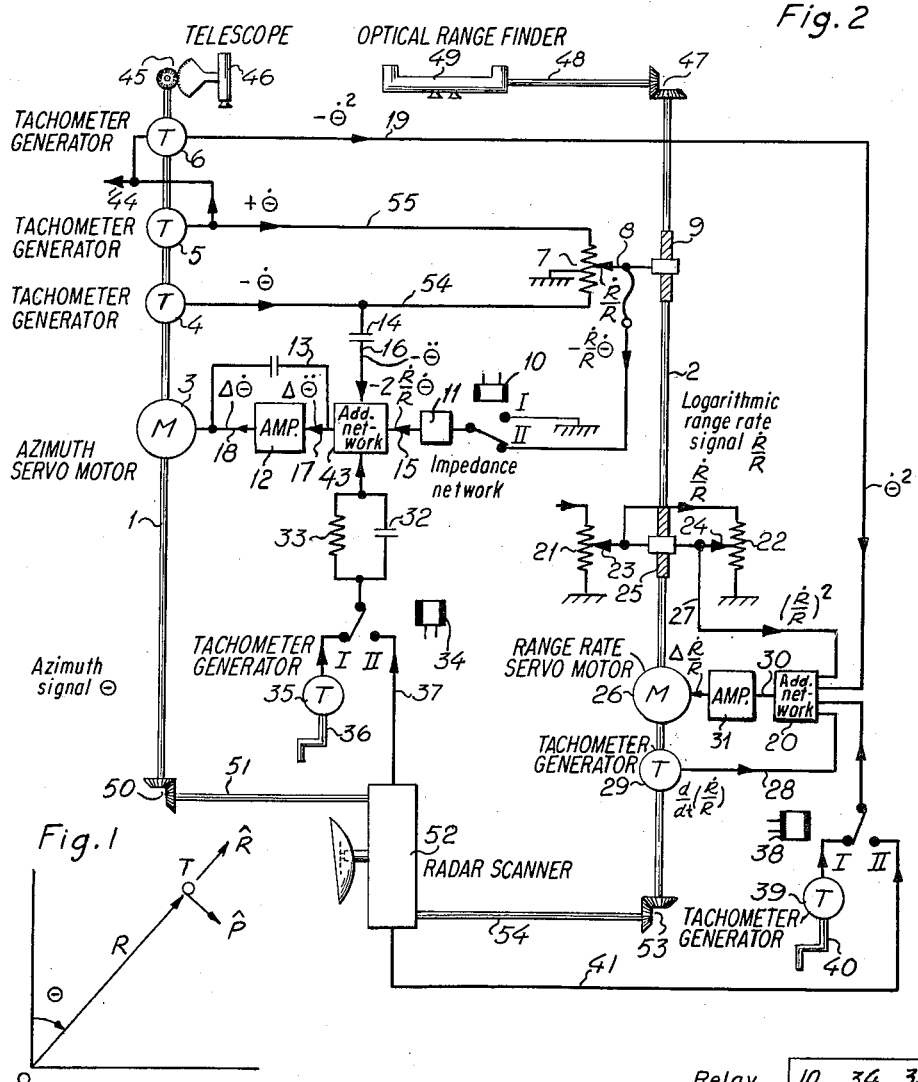

Feb. 6, 1962  T. TEILING ETAL  3,020,538
MEANS FOR TRACKING MOVABLE TARGETS
Filed Aug. 8, 1957

Inventors
Torbern Teiling
Bengt E. T. Bengtsson
by Sommers & Young
Attorneys

United States Patent Office 3,020,538
Patented Feb. 6, 1962

3,020,538
MEANS FOR TRACKING MOVABLE TARGETS
Torben Teiling, Lidingo, and Bengt Evald Torsten Bengtsson, Vallingby, Sweden, assignors to Arenco Aktiebolag, Stockholm, Sweden, a Swedish joint-stock company
Filed Aug. 8, 1957, Ser. No. 677,020
Claims priority, application Sweden Aug. 30, 1956
7 Claims. (Cl. 343—7.4)

This invention relates to an improved apparatus for automatically tracking a moving target used in conjunction with either optical, manual, or radar automatic tracking means for following a target moving at a constant speed in a constant direction and by means of which control signals are supplied to servo motors coupled to rotatable shafts adapted for adjusting said tracking means and being adapted, by their rotary movements to represent and reproduce the polar coordinates of the target, which coordinates are to be measured and followed continuously by said tracking means, said control signals being based on control accelerations which solely consist of derivatives of the polar coordinates of the target.

In arrangements, not utilizing the derivatives for controlling the tracking means, such derivatives are produced by differentiating corresponding polar values. Thereby the derivatives will vary materially even though the instability of said polar values might be slight and such derivatives have to be smoothed to be utilizable for extrapolation and determination of the lead point in a ballistic corrector.

Said inconveniences will be removed by the use of the device according to the present invention in which correct derivatives will be obtained continuously during the course of tracking, that is, simultaneously as the sight follows the target.

The solution of the control equations for automatic tracking can be made under the presumption that the vectorial speed of the target is constant.

When the speed of the target is assumed to be constant in a constant direction so that the corresponding acceleration will be nil, a simplified solution can be obtained which satisfies normal requirements for automatic tracking.

The invention will be described more particularly by way of an exemplary embodiment operating with only two polar coordinates in a plane polar system in order to facilitate the understanding of the invention and with reference to the accompanying drawing, in which FIGURE 1 is a diagram showing a plane polar coordinate system, FIGURE 2 is a diagrammatic view of an embodiment of the invention operating with two coordinates only, namely azimuth angle $\theta$ and range R of the target in a horizontal plane, and FIGURE 3 is a table illustrating the possibilities of changing over the arrangement shown in FIGURE 2.

In FIGURE 1, the polar coordinate R denotes the range in a horizontal plane between an observation station O and a target T in a plane polar coordinate system.

The polar coordinate $\theta$ denotes the azimuth angle between a predetermined direction and the sight line O—T. The figure illustrates further the vectorial directions or unit vectors R and $\hat{p}$ in the directions of radius vector and a perpendicular vector, respectively. The first time derivative of the vector $R\hat{R}$ in radial direction, that is $$\frac{d}{dt}(R\hat{R})$$

is a vectorial velocity which is denoted $\bar{v}$, and accordingly $$\bar{v} = \frac{d}{dt}(R\hat{R}) = \frac{dR}{dt}\hat{R} + R\frac{d\theta}{dt}\hat{p} \qquad (1)$$

If the first time derivative of R, that is $$\frac{dR}{dt}$$

is denoted $\dot{R}$ and the first time derivative of $\theta$, that is, $$\frac{d\theta}{dt}$$

is denoted $\dot{\theta}$ Equation 1 may be written $$\bar{v} = \dot{R}\hat{R} - R\dot{\theta}\hat{p} \qquad (1a)$$

The first time derivative of $\bar{v}$ is an acceleration vector $$\bar{a} = \frac{d}{dt}(\bar{v})$$

and by means of Equation 1a $\bar{a}$ can be expressed as $$\bar{a} = \frac{d}{dt}(\bar{v}) = (\ddot{R} - R\dot{\theta}^2)\hat{R} + (R\ddot{\theta} + 2\dot{R}\dot{\theta})\hat{p} \qquad (2)$$

where $\ddot{R}$ and $\ddot{\theta}$ are the second time derivatives of R and $\theta$, respectively.

The acceleration vector $\bar{a}$, Equation 2, can be divided into two components, namely one, $a_R$, in the $\hat{R}$-direction and one, $a_p$ in the $\hat{p}$-direction, so that $$a_R = \ddot{R} - R\dot{\theta}^2 \qquad (3)$$

$$a_p = R\ddot{\theta} + 2\dot{R}\dot{\theta} \qquad (4)$$

If the target moves at a constant vectorial speed, that is, at a constant speed in a constant direction to the sight line O—T, the acceleration components $a_R$ and $a_p$ will be equal nil and Equations 3 and 4 can accordingly be written $$0 = \ddot{R} - R\dot{\theta}^2 \qquad (3a)$$

$$0 = \ddot{\theta} + \frac{\dot{R}}{R}\dot{\theta} \qquad (4a)$$

or $$0 = -\ddot{\theta} - 2\frac{\dot{R}}{R}\dot{\theta} \qquad (4ab)$$

In order to have the target continuously and automatically followed by the tracking apparatus this apparatus must operate according to these equations, of which (3a) also may be written $$0 = \frac{d}{dt}\left(\frac{\dot{R}}{R}\right) + \left(\frac{\dot{R}}{R}\right)^2 - \dot{\theta}^2 \qquad (3ab)$$

Referring now to FIGURE 2 the rotation of a shaft 1 represents the azimuthal rotation of a telescope 46 driven from the shaft 1 through gears 45 or the azimuthal rotation of a radar scanner 52 driven from said shaft through gears 50 and a shaft 51. Thus, the momentary angular position of said shaft corresponds to the instantaneous azimuth $\theta$ of the target when the target is followed by the tracking apparatus.

In said radar scanner 52 the rotation of the shaft 1 is converted into a voltage representing the azimuth angle $\theta$ of the shaft 1. This voltage is fed to a comparator network (not shown) of the radar scanner to be compared with an azimuth signal generated by the radar scanner. If the voltage fed into the comparator network does not correspond to the azimuth signal generated by the radar scanner 52 an error signal will arise which indicates that the target is not being followed by the radar scanner.

The rotation of the shaft 2 represents the term $$\frac{\dot{R}}{R}$$

appearing in Equations 4a and 3ab. This term will be called the logarithmic range rate, because the ratio $$\frac{\dot{R}}{R}$$

is the time derivative of ln R, that is $$\frac{d(\ln R)}{dt} = \frac{\dot{R}}{R}$$

The rotation of the shaft 2 is transferred through gears 47 and a shaft 48 to an optical range finder 49 where the range rate $$\frac{\dot{R}}{R}$$

is converted to a value representing the range R, and is transferred to the radar scanner 52 through gears 53 and a shaft 54. In said radar scanner 52 the rotation of the shaft 2 is converted into a voltage representing the range R said voltage being fed to a comparator network (not shown) of the radar scanner to be compared with the range signal generated by the radar scanner 52 and representing the range of the target. If the converted logarithmic range rate value does not correspond to the range signal generated by the radar scanner 52 an error signal will arise which indicates that the target is not being followed by the radar scanner.

The servo system guiding the shafts 1 and 2 comprises the following components and operates as follows:

The shaft 1, representing the azimuthal rotation of the tracking means 46 or 52 is driven by an azimuth servo motor 3. Tachometer generators 4, 5 and 6 are mechanically connected to said shaft 1. The tachometer generators 4 and 5 produce voltages proportional to the azimuthal speed $\theta$ which voltages have been denoted $-\theta$ and $+\theta$, respectively. Said voltages are fed on leads 55 and 56, respectively to the upper and lower terminals of a potentiometer 7. The movable arm 8 of the potentiometer is connected to the shaft 2 by means of a screw 9 so that the contact point of the arm 8 corresponds to the range rate $$\frac{\dot{R}}{R}$$

which value is multiplied with the potential difference between ground and the one end of the potentiometer 7, that is $\pm \theta$, so that the product $$-\frac{\dot{R}}{R}\theta$$

with its present sign appears on a lead 57. Said product, by way of a relay 10, in position II, introduced through an impedance 11 and a lead 15 into an adding network 43. The impedance 11 is so dimensioned that the signal on the lead 15 corresponds to a voltage $$-2\frac{\dot{R}}{R}\theta$$

which corresponds to the one term of Equation 4a, serving as the guide equilibrium of the azimuth shaft 1. The other term of the Equation 4a is derived from the signal $-\theta$ on the lead 55. This signal is differentiated by means of a condenser 14 and fed to the adding network 43 through a lead 16. As long as the sum of the signal $-\theta$, which is the signal derived from the azimuth shaft 1 and accordingly called the measured signal, and the signal $$-2\frac{\dot{R}}{R}\theta$$

which is not completely derived from the azimuth shaft R, but partly from an external source, for example, the shaft 2 and accordingly called the calculated signal, satisfies the azimuthal acceleration Equation 4a, the adding network 43 will not generate any output signal. If the shaft 1 tends to decrease or increase its rotational speed the acceleration value will be altered and accordingly the acceleration equilibrium represented by Equation 4a will not be satisfied, that is, the sum of the measured acceleration signal $-\theta$ and the calculated acceleration signal $$-2\frac{\dot{R}}{R}\theta$$

differs from nil with a value represented by an unbalance voltage arbitrarily denoted $\Delta\theta$. Said unbalance will, by way of the output of the summator 43, create a corresponding control signal $\Delta\theta$ in the lead 17 to the input of an integrating servo amplifier 12. Said unbalance voltage $\Delta\theta$ is integrated in known manner by means of a condenser 13, constituting a feed back network of the amplifier 12, so that the output voltage of the amplifier 12 in a lead 18 will represent an integrated unbalance signal $\Delta\theta$ which operates the servo motor 3 so that the azimuth shaft 1 will maintain the desired velocity. Said integration need not be accurate because it consists of an integration of an unbalance signal $\Delta\theta$ approaching nil and because its main object is to cause the input voltage in the lead 18 to the servo motor 3 to approximately represent the speed of the shaft 1 whereby the stability in the closed circuit from the motor 3 over the tachometer generator 4 will be improved.

The range rate shaft 2 the rotation of which represents the logarithmic range rate value $$\frac{\dot{R}}{R}$$

of Equation 3ab and the range setting of the range finder 49 and the radar scanner 52 is driven by a range rate servo motor 26. In this case the measured control signals, that is, signals which are function of only the movement of the shaft 2, comprise the values $$\frac{d}{dt}\left(\frac{\dot{R}}{R}\right) \text{ and } \left(\frac{\dot{R}}{R}\right)^2$$

in the acceleration Equation 3ab while the calculated signal is represented by the value $\theta^2$. A voltage corresponding to the signal $$\frac{d}{dt}\left(\frac{\dot{R}}{R}\right)$$

is generated by a tachometer generator 29 which is mechanically coupled to the shaft 2, the rotation of which as already mentioned represents the logarithmic range rate $$\frac{\dot{R}}{R}$$

The second measured signal $$\left(\frac{\dot{R}}{R}\right)^2$$

is generated by the linear potentiometers 21 and 22 which are connected in series and the movable arms 23 and 24 of which are adjusted by means of the screw 25 on the shaft 2. The upper and lower terminals of the potentiometer 21 are connected to a reference potential and the center point of the potentiometer is grounded. The reference potential is such that the voltage at the output terminal, that is, the movable arm 23 which is set in dependence on the movement of the shaft 2, corresponds to the logarithmic range rate $$\frac{\dot{R}}{R}$$

This output voltage $$\frac{\dot{R}}{\overline{R}}$$

is fed to the upper and lower terminal of the potentiometer 22 which has its center point grounded. As the movable arm 24 is adjusted by the shaft 2 the output voltage on the lead 27 will be equal to $$\left(\frac{\dot{R}}{\overline{R}}\right)^2$$

The calculated value $-\dot{\theta}^2$ is generated by a tachometer generator 6 mechanically connected to the shaft 2.

Said three signals $$\frac{d}{dt}\left(\frac{\dot{R}}{\overline{R}}\right), \left(\frac{\dot{R}}{\overline{R}}\right)^2$$

and $-\dot{\theta}^2$ are fed to an adding network 20 through leads 28, 27, and 19, respectively. As long as the sum of these three signals are equal to nil, the output of the adding network 20 also will be equal to nil, but if the shaft 2 tends to decrease or increase its rotational speed determined by the two measured acceleration signals $$\frac{d}{dt}\left(\frac{\dot{R}}{\overline{R}}\right) \text{ and } \left(\frac{\dot{R}}{\overline{R}}\right)^2$$

the acceleration equilibrium represented by Equation 3*ab* will not be satisfied and an unbalance voltage arbitrarily denoted $$\Delta\frac{\dot{R}}{\overline{R}}$$

will appear on the output lead 30 of the adding network 20. Said unbalance signal $$\Delta\frac{\dot{R}}{\overline{R}}$$

is fed on the lead 30 to a servo amplifier 31 which transmits a control voltage to the servo motor 26 so as to maintain the desired rotation of the shaft 2.

The initial tracking of the target in order to obtain azimuth and range rate data is manually provided by setting selector switch 42, schematically shown in FIGURE 2, in position "Manual Control." In this position of the switch 42 each relay 10, 34, 38 (FIGURE 2) is in position I as indicated in FIGURE 3.

When the switch 42 is in position "Manual Control" the operators actuate azimuth handwheel 36 and range rate handwheel 40, respectively, until the line of sight O—T (FIGURE 1) defined by the telescope 46 is directed toward the target T and the range value R is correctly obtained by the range finder 49 or until the markings on the screen of the radar scanner 52 indicate that the target is being followed. When actuating the handwheel 36 a tachometer generator 35 connected to said handwheel 36 generates a control signal to a network comprising a condenser 32 in parallel with a resistance 33 and connected to the adding network 43. A corresponding control signal appears on the output 17 of the adding network 43 and operates the servo motor 3 and, thus, the telescope 46 and the radar scanner 52. The handwheel 40 is connected to a tachometer generator 39 which when the handwheel 40 is actuated transmits a control signal to the adding network 20. A corresponding control signal appears on the output lead 30 of the adding network 20 and operates the servo motor 26 and thus the range finder 49 and the radar scanner 52.

As soon as accurate tracking has once been established by either the optical tracking means 46, 49 or the radar scanner 52 the switch 42 is set in position "Automatic tracking, manual corrections" or position "Automatic tracking, radar corrections" in order to have the servo system automatically take over the task of tracking the target.

In position "Automatic tracking, manual corrections," relays 10, 34 and 38, as indicated in FIGURE 3, will be in position II, I and I, respectively, that is the tracking means 45, 49 and 52 will be automatically controlled by the servo system already described so as to maintain correct tracking as long as the target does not change its course or speed. Changes in target course or speed are in said position of the switch 42 compensated by manually feeding corresponding correction values into the servo system by means of hand wheel 36.

In position "Automatic tracking, radar corrections" relays 10, 34 and 38, as indicated in FIGURE 3, will be in position II, II, II, respectively, so that the tracking means 45, 49 and 52 will be automatically controlled by the servo system and the target followed as long as it maintains constant speed and course. Changes in target course or speed will be detected by the compensating networks of the radar scanner 52, which, when the range signal represented by the shaft 54 or the azimuth signal represented by the shaft 51 does not correspond to corresponding radar echo signals derived by the radar scanner, generates a proper correction signal on the leads 41 or 37 until the target again is kept in sight.

The embodiment as described and illustrated can, of course, be provided with tracking means operating in accordance with the third polar coordinate corresponding to altitudinal angular movements.

From the foregoing it is evident that those members, especially the tachometer generators which partake in the calculation of the control accelerations and are mechanically connected to the shafts of the sighting means may be powerful, and nevertheless the power required for their rotation will be slight relative to the power of the servo motor. Therefore, the tachometer generators may produce a substantial voltage and a correspondingly high information and low noise ratio whereby several amplification stages can be omitted in the calculation chains, which stages would be indispensible in prior devices for the same purpose.

Thus, the control of the movement in azimuth does not require any amplification stages between the tachometer generators and the conventional servo amplifier 12 and adding network 43.

By the automatic control described herein the correct values of the derivatives of the motion of the shafts of the tracking means will be obtained as contemplated by the present invention because said derivatives form a basis of the control of the tracking means. By suitable proportioning of the various components very smoothly varying values of the polar coordinates and their derivatives will be obtained.

If it should be desirable to incorporate in the tracking means a ballistic corrector it would be possible to transmit by simple means voltages from said powerful tachometer generators also to said corrector, which voltages represent the derivatives of the coordinates of the polar values. The polar values can, of course, be transmitted mechanically to the corrector. Thus, the derivative $\dot{\theta}$ of the azimuth angle can be transmitted by the lead 44 and the polar value $\theta$ is derived mechanically from the shaft 1.

We claim:

1. In an automatic target tracking apparatus for following a moving target the combination of an azimuth sighting means, an azimuth shaft operatively connected with said azimuth sighting means for registering the present azimuth angle $\theta$ indicated by said azimuth sighting means, an azimuth servo motor operatively connected with said azimuth shaft, a first signal generating means controlled by said azimuth shaft so as to generate a first measured control signal $\dot{\theta}$ which is the first time derivative of said azimuth angle $\theta$, a range finding means, a second signal generating means operatively connected with said range finding means to generate a calculated signal $$\frac{\dot{R}}{R}$$

wherein R is the present range to the target and $\dot{R}$ the first time derivative thereof, a multiplying network, means for feeding said first measured control signal $\dot{\theta}$ and said calculated signal $$\frac{\dot{R}}{R}$$

into said multiplying network to obtain a product signal $$-2\frac{\dot{R}}{R}\dot{\theta}$$

a third signal generating means controlled by said azimuth shaft so as to generate a second measured control signal $-\ddot{\theta}$ which is the second time derivative of said azimuth angle $\theta$, means for adding said product signal $$-2\frac{\dot{R}}{R}\dot{\theta}$$

and said second measured control signal $-\ddot{\theta}$ to obtain a difference signal $\Delta\dot{\theta}$ which is equal to the sum $$-2\frac{\dot{R}}{R}\dot{\theta}-\ddot{\theta}$$

an integrating network, means for feeding said difference signal $\Delta\dot{\theta}$ into said integrating network, the output of said integrating network being connected to the input of said servo motor to provide a second difference signal $\Delta\theta$ corresponding to the required increase or decrease of the velocity of said azimuth shaft to have the target followed by the azimuth sighting means.

2. Apparatus according to claim 1, and in which said sighting means is a radar scanner.

3. Apparatus according to claim 1 and in which said sighting means is comprised of both an optical sighting device and a radar scanner.

4. Apparatus according to claim 1 in which said first signal generating means consists of a pair of tachometer generators mechanically connected to said azimuth shaft and generating the signals $-\dot{\theta}$ and $+\dot{\theta}$, respectively.

5. In an automatic target tracking apparatus for following a moving target the combination of an azimuth sighting means, an azimuth shaft operatively connected with said azimuth sighting means for registering the present azimuth angle $\theta$ as indicated by said azimuth sighting means, an azimuth servo motor operatively connected with said azimuth shaft, a first signal generating means controlled by said azimuth shaft so as to generate a first measured control signal $\dot{\theta}$ which is the first time derivative of said azimuth angle $\theta$, a range finding means, a range rate shaft operatively connected with said range finding means for registering the present logarithmic range $$\frac{\dot{R}}{R}$$

of the target wherein R is the present range to the target and $\dot{R}$ the first time derivative thereof, a second signal generating means controlled by said range rate shaft so as to generate a calculated signal $$\frac{\dot{R}}{R}$$

a multiplying network, means for feeding said first measured control signal $\dot{\theta}$ and said calculated signal $$\frac{\dot{R}}{R}$$

into said multiplying network to obtain a product signal $$-2\frac{\dot{R}}{R}\dot{\theta}$$

a third signal generating means controlled by said azimuth shaft so as to generate a second measured control signal $-\ddot{\theta}$ which is the second time derivative of said azimuth angle $\theta$, means for adding said product signal $$-2\frac{\dot{R}}{R}\dot{\theta}$$

and said second measured control signal $-\ddot{\theta}$ to obtain a difference signal $\Delta\dot{\theta}$ to obtain a difference signal $\Delta\dot{\theta}$ which is equal to the sum $$-2\frac{\dot{R}}{R}\dot{\theta}-\ddot{\theta}$$

an integrating network, means for feeding said difference signal $\Delta\dot{\theta}$ into said integrating network, the output of said integrating network being connected to the input of said servo motor to provide a second difference signal $\Delta\theta$ corresponding to the required increase or decrease of the velocity of said azimuth shaft to have the target followed by the azimuth sighting means.

6. Apparatus according to claim 5 and a fourth generating means operated by said range rate shaft to convert the movement thereof represented by the logarithmic range rate $$\frac{\dot{R}}{R}$$

into a first measured range rate signal $$\left(\frac{\dot{R}}{R}\right)^2$$

a fifth signal generating means operated by said range rate shaft to convert the movement thereof represented by the logarithmic range rate $$\frac{\dot{R}}{R}$$

into a second measured range rate signal $$\frac{d}{dt}\left(\frac{\dot{R}}{R}\right)$$

which is the first time derivative thereof, a sixth signal generating means operating in dependence on the present azimuth angle as represented by said azimuth sighting means and generating a calculated azimuth signal $-\dot{\theta}^2$ which is the second time derivative of the present azimuth angle $\theta$, means for adding said first measured range rate signal $$\left(\frac{\dot{R}}{R}\right)^2$$

said second measured range rate signal $$\frac{d}{dt}\left(\frac{\dot{R}}{R}\right)$$

and said calculated azimuth signal $-\dot{\theta}^2$ to obtain a difference signal $$\Delta\frac{\dot{R}}{R}$$

which is equal to the sum $$\frac{d}{dt}\left(\frac{\dot{R}}{R}\right)+\left(\frac{\dot{R}}{R}\right)^2-\dot{\theta}^2$$

and means for feeding said difference signal $$\Delta\frac{\dot{R}}{R}$$

to the input of a range rate servo motor which is operatively connected for driving said range rate shaft.

7. Apparatus according to claim 6 in which said fifth signal generating means consists of a tachometer generator mechanically connected to said range rate shaft, and said sixth signal generating means consists of a tachometer generator mechanically connected to said azimuth shaft.

No references cited.